US009332245B2

(12) United States Patent
Sakurabu

(10) Patent No.: US 9,332,245 B2
(45) Date of Patent: May 3, 2016

(54) STEREOSCOPIC IMAGE DISPLAY DEVICE, STEREOSCOPIC IMAGE DISPLAY METHOD, AND NON-TRANSITORY COMPUTER-READABLE RECORDING MEDIUM

(71) Applicant: FUJIFILM Corporation, Minato-ku, Tokyo (JP)

(72) Inventor: Hitoshi Sakurabu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 583 days.

(21) Appl. No.: 13/721,619

(22) Filed: Dec. 20, 2012

(65) Prior Publication Data

US 2013/0107018 A1 May 2, 2013

Related U.S. Application Data

(63) Continuation of application No. PCT/JP2011/061803, filed on May 24, 2011.

(30) Foreign Application Priority Data

Jun. 22, 2010 (JP) .................................. 2010-141781

(51) Int. Cl.
*H04N 5/232* (2006.01)
*H04N 13/02* (2006.01)
(52) U.S. Cl.
CPC ....... *H04N 13/0207* (2013.01); *H04N 5/23219* (2013.01); *H04N 13/0239* (2013.01)
(58) Field of Classification Search
None
See application file for complete search history.

(56) References Cited

U.S. PATENT DOCUMENTS

2007/0242149 A1 10/2007 Zhang
2008/0225155 A1* 9/2008 Ebato et al. ............... 348/333.05
2009/0015681 A1* 1/2009 Pipkorn ............. H04N 5/23219
348/208.12
2009/0244313 A1* 10/2009 Masuda ............. H04N 5/23219
348/222.1

(Continued)

FOREIGN PATENT DOCUMENTS

CN 101056362 A 10/2007
EP 1087336 A2 3/2001

(Continued)

OTHER PUBLICATIONS

Notification of First Office Action, dated Jul. 2, 2014, issued in corresponding CN Application No. 201180031112.8, 17 pages in English and Chinese.

(Continued)

*Primary Examiner* — Kevin McInnish
(74) *Attorney, Agent, or Firm* — Sughrue Mion, PLLC

(57) ABSTRACT

A stereoscopic image display device comprising: a parallax information acquisition device configured to acquire parallax information for each of a plurality of face regions present in different view point images; a display method selection device configured to select a display method of the plurality of face regions; a face region selection device configured to select a specific face region out of the plurality of face regions according to the display method selected by the display method selection device; a parallax adjustment device configured to adjust a parallax amount of the specific face region in the view point image based on the parallax information of the specific face region selected by the face region selection device; and a display controller displaying a stereoscopic image on a predetermined display device based on the view point image in which the parallax amount of the specific face region is adjusted by the parallax adjustment device.

5 Claims, 12 Drawing Sheets

(56) References Cited

U.S. PATENT DOCUMENTS

2010/0328432 A1* 12/2010 Tanaka .......................... 348/46
2011/0025829 A1* 2/2011 McNamer et al. ............. 348/50

FOREIGN PATENT DOCUMENTS

| JP | 2002-051255 A | 2/2005 |
| JP | 2008-022150 A | 1/2008 |
| JP | 2009-129420 A | 6/2009 |
| JP | 2010-107664 A | 5/2010 |

OTHER PUBLICATIONS

International Preliminary Report on Patentability and Written Opinion, dated Jan. 24, 2013, issued in corresponding International Application No. PCT/JP2011/061803, 10 pages in English and Japanese.

* cited by examiner

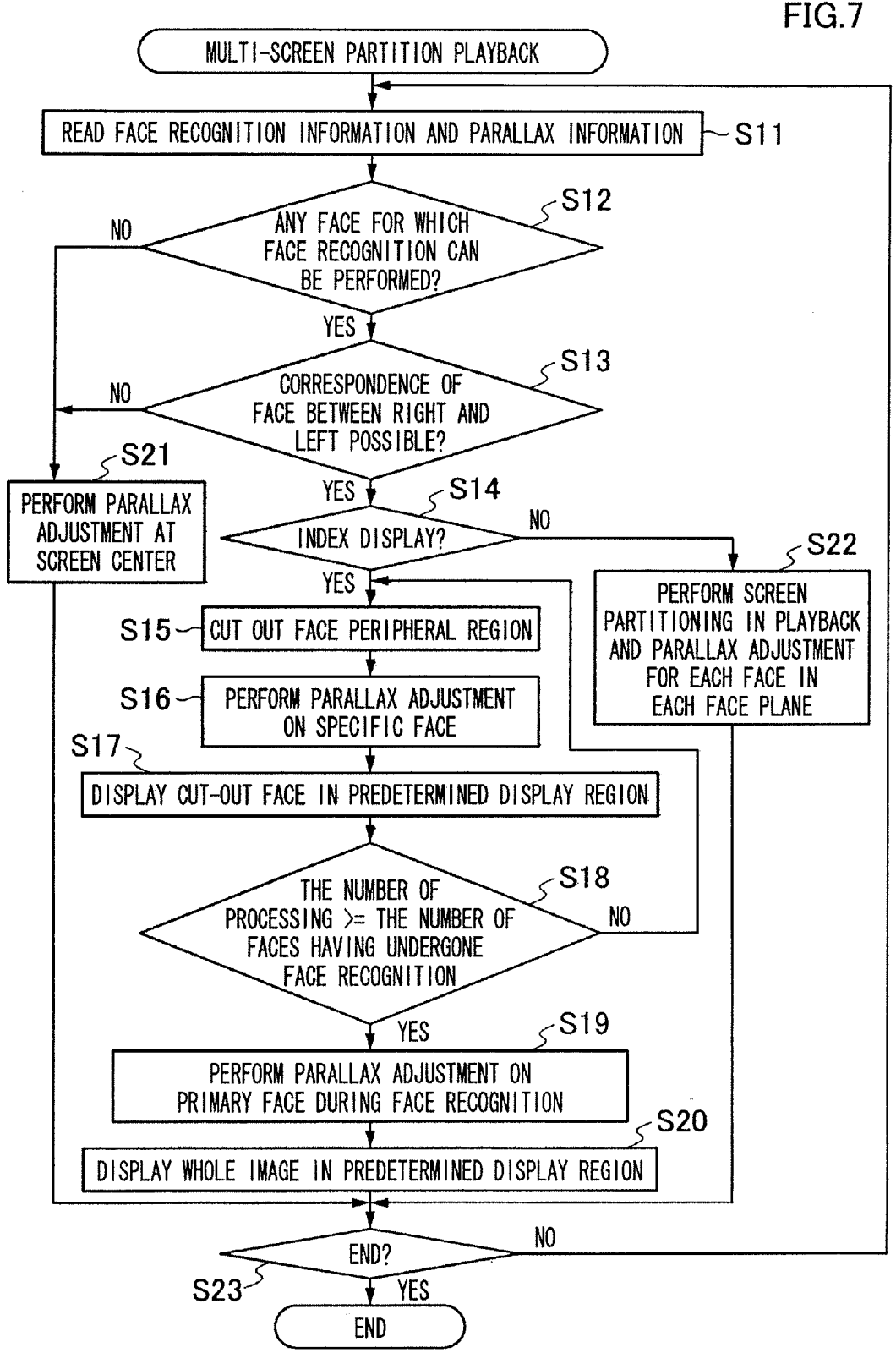

PRIMARY FACE IN FACE RECOGNITION

PRIMARY FACE IN FACE RECOGNITION

RANGE WITHIN WHICH FACE UNDERGOES CENTERING

PRIMARY FACE IN FACE DESIGNATION 70-50% OF WHOLE SCREEN

STEREOSCOPIC IMAGE DISPLAY DEVICE, STEREOSCOPIC IMAGE DISPLAY METHOD, AND NON-TRANSITORY COMPUTER-READABLE RECORDING MEDIUM

This application is a continuation application and claims the priority benefit under 35 U.S.C. §120 of PCT Application No. PCT/JP2011/061803 filed on May 24, 2011 which application designates the U.S., and also claims the priority benefit under 35 U.S.C. §119 of Japanese Patent Application No. 2010-141781 filed on Jun. 22, 2010, which applications are all hereby incorporated in their entireties by reference.

TECHNICAL FIELD

The present invention relates to display of a stereoscopic image, and specifically, relates to display of a stereoscopic image containing a plurality of faces.

BACKGROUND ART

According to PTL 1, a face detection part 30 detects a reference subject region in which the subject is present from a first image G1 and detects a correspondence subject region corresponding to the reference subject region from a second image G2, which images are acquired by image capturing parts 21A and 21B. A region configuration part 31 configures a reference cut-out region within a predetermined range including the reference subject region on the first image G1 and a temporary cut-out region within a predetermined range including the correspondence subject region on the second image G2. Then, shifting the temporary cut-out region over the second image G2, a displacement amount between a predetermined structure of the subject included in the reference cut-out region and the predetermined structure of the subject included in the temporary cut-out region is detected, and the temporary cut-out region at the position where the displacement amount is at its minimum is configured as a correspondence cut-out region to the reference cut-out region. A trimming part 32 trims the reference cut-out region from the first image G1 and the correspondence cut-out region from the second image G2.

According to PTL 2, image capturing of the subject is performed under the condition that the light axes of a plurality of imaging units become parallel, and the image data is stored in a frame memory 12. A CPU 10 detects positions of a face in a plurality of captured images obtained from both imaging units I1 and I2 and instructs a motor driver 11 to move nuts N1 and N2, and thereby, to adjust the angle of convergence. Both imaging units I1 and I2 generate the image data for the right view point and for the left view point, respectively.

CITATION LIST

Patent Literature

{PTL 1} Japanese Patent Application Laid-Open No. 2009-129420
{PTL 2} Japanese Patent Application Laid-Open No. 2008-22150

SUMMARY OF INVENTION

Technical Problem

Playback of a stereoscopic image needs a parallax matched to a certain point in view point images. Therefore, the stereoscopic image contains a portion in which the parallax is matched and a portion in which that is not matched. Typically, the parallax is adjusted around the center of the angle of view (image center portion). Hence, when a face is the primary subject on the occasion of image capturing for a person or the like, in case of the person being except the center of screen, matching the parallax to the center causes no matching of the parallax to the face (FIG. 11A to FIG. 11E).

FIG. 11A is a diagram schematically illustrating position relationship between right and left image capturing parts of a stereoscopic image capturing device and subjects (person and tower), FIG. 11B illustrates images obtained by capturing the subjects using the right and left image capturing parts in the position relationship in FIG. 11A (right image capturing part image and left image capturing part image, respectively). FIG. 11C is a diagram schematically illustrating relationship between the positions of the subjects and the images of the subjects obtained from the right image capturing part image and left image capturing part image. FIG. 11D illustrates the right image capturing part image and left image capturing part image in the case that a cross point is configured to the center portion of the images. FIG. 11E illustrates the right image capturing part image and left image capturing part image in the case that a cross point is configured to the subject having undergone face recognition. In addition, in FIG. 11B to FIG. 11E, solid lines denote images obtained from the left image capturing part and broken lines denote images obtained from the right image capturing part.

As illustrated in FIG. 11C, when the position of the subject is at and in the vicinity of the cross point configuration position (medium distance), playback images of the right image capturing part image and left image capturing part image substantially overlap. On the other hand, when the position of the subject is at a shorter distance or longer distance than the cross point configuration position, playback images of the subject cause a double image. For this reason, in the case of the position relationship in FIG. 11A, configuring a cross point to the center portion of the image causes a double image of the face of the subject (person) which is at a shorter distance compared with the subject (tower) at the center portion of the image as illustrated in FIG. 11D.

Therefore, as in PTL 1, it is considered that face recognition is performed and that the parallax is matched to the position obtained by the face recognition, not to the center of the angle of view (FIG. 11E). However, when a plurality of faces are present within the angle of view, the parallax is possibly not matched to some faces.

The present invention realizes display of a stereoscopic image which is natural in case of the presence of a number of persons by controlling a parallax so as to properly matching the parallax even in case of any face being seen, based on parallax information corresponding to all of the faces except the primary face.

Solution to Problem

A stereoscopic image display device according to one aspect of the present invention includes: a parallax information acquisition part acquiring parallax information for each of a plurality of face regions present in different view point images; a display method selection part selecting a display method of the plurality of face regions; a face region selection part selecting a specific face region out of the plurality of face regions according to the display method selected by the display method selection part; a parallax adjustment part adjusting a parallax amount of the specific face region in the view point image based on the parallax information of the specific face region selected by the face region selection part; and a display controller displaying a stereoscopic image on a predetermined display device based on the view point image in which the parallax amount of the specific face region is adjusted by the parallax adjustment part.

Preferably, the display method selection part selects any one out of the face regions and selects a display method of displaying the selected face region, the face region selection part selects any one face region out of the face regions based on selection operation, and the parallax adjustment part adjusts the parallax amount of the selected face region in the view point image based on the parallax information of the selected face region.

Preferably, the face region selection part selects any one out of the plurality of face regions which are displayed in a list on the display device.

Preferably, the display method selection part sequentially selects any one out of the plurality of face regions and selects a display method of displaying the sequentially selected face region sequentially and individually, the face region selection part sequentially selects any one face region out of the plurality of face regions, the parallax adjustment part adjusts the parallax amount of the sequentially selected face region based on the parallax information of the sequentially selected face region, and the display controller sequentially displays the face region for which the parallax amount is adjusted.

Preferably, the display method selection part selects a display method of displaying each of the face regions in each of partition screens separately, the face region selection part selects a face region displayed in each partition screen out of the face regions and includes a cutting-out part cutting out each face region selected by the face region selection part from the view point image, the parallax adjustment part adjusts the parallax amount for each face region cut out by the cutting-out part based on the parallax information of each face region displayed in each of the partition screens, and the display controller displays each face region for which the parallax amount is adjusted in each partition screen.

Preferably, the display method selection part selects any one out of the face regions and selects a display method of displaying the face regions such that all of those are contained within a predetermined angle of view, setting the selected face region as a reference, the face region selection part selects any one face region out of the face regions and includes a cutting-out part configuring, in the view point image, a cutting-out range in which all of the plurality of face regions are contained within the predetermined angle of view, setting the selected face region as a reference, and cutting out an image in the cutting-out range from the view point image, the parallax adjustment part adjusts the parallax amount of the selected face region in the view point image used for the cutting-out of the cutting-out part based on the parallax information of the selected face region, and the display controller displays the cut-out image for which the parallax amount is adjusted.

Preferably, the display method selection part selects a display method of displaying each of the face regions in each of partition screens separately, the face region selection part selects a face region displayed in each partition screen out of the face regions, the parallax adjustment part adjusts the parallax amount for each face region displayed in each of the partition screens based on the parallax information of each face region displayed in each of the partition screens and includes a cutting-out part cutting out each face region selected by the face region selection part from the view point image for which the parallax amount for each of the face regions is adjusted, and the display controller displays the view point image of each face region cut out by the cutting-out part in each partition screen.

Preferably, the display method selection part selects any one out of the face regions and selects a display method of displaying the face regions such that all of those are contained within a predetermined angle of view, setting the selected face region as a reference, the face region selection part selects any one face region out of the face regions, the parallax adjustment part adjusts the parallax amount of the selected face region in the view point image selected by the face region selection part based on the parallax information of the selected face region and includes a cutting-out part configuring, in the view point image, a cutting-out range in which all of the plurality of face regions are contained within the predetermined angle of view, setting the selected face region as a reference, and cutting out an image in the cutting-out range from the view point image, and the display controller displays the cut-out image which the cutting-out part has cut out from the view point image.

A stereoscopic image display method according to one aspect of the present invention includes: by a computer, a step of acquiring parallax information for each of a plurality of face regions present in different view point images; a step of selecting a display method of the plurality of face regions; a step of selecting a specific face region out of the plurality of face regions according to the display method selected; a step of adjusting a parallax amount of the specific face region in the view point image based on the parallax information of the specific face region selected; and a step of displaying a stereoscopic image on a predetermined display device based on the view point image in which the parallax amount of the specific face region is adjusted.

A stereoscopic image display program according to one aspect of the present invention causes a computer to realize: a function of acquiring parallax information for each of a plurality of face regions present in different view point images; a function of selecting a display method of the plurality of face regions; a function of selecting a specific face region out of the plurality of face regions according to the display method selected; a function of adjusting a parallax amount of the specific face region in the view point image based on the parallax information of the specific face region selected; and a function of displaying a stereoscopic image on a predetermined display device based on the view point image in which the parallax amount of the specific face region is adjusted.

A recording medium according to one aspect of the present invention is a computer-readable recording medium, when a processor reads and executes commands stored in the recording medium, the processor performing: a step of acquiring parallax information for each of a plurality of face regions present in different view point images; a step of selecting a display method of the plurality of face regions; a step of selecting a specific face region out of the plurality of face regions according to the display method selected; a step of adjusting a parallax amount of the specific face region in the view point image based on the parallax information of the specific face region selected; and a step of displaying a stereoscopic image on a predetermined display device based on the view point image in which the parallax amount of the specific face region is adjusted.

Advantageous Effects of Invention

According to the present invention, information of face regions in correspondence relation between view point images and parallax information of those are acquired along with the images, and parallax adjustment is performed according to a parallax of a face selected in accordance with a display method to display a stereoscopic image. Accordingly, as to a stereoscopic image containing a plurality of faces, stereoscopic vision in which a parallax is optimized for a target face and which is natural and less in load on eyes can be displayed.

BRIEF DESCRIPTION OF DRAWINGS

FIG. 7 is a flowchart of display processing according to a second embodiment.

DESCRIPTION OF EMBODIMENTS

Figure 1:
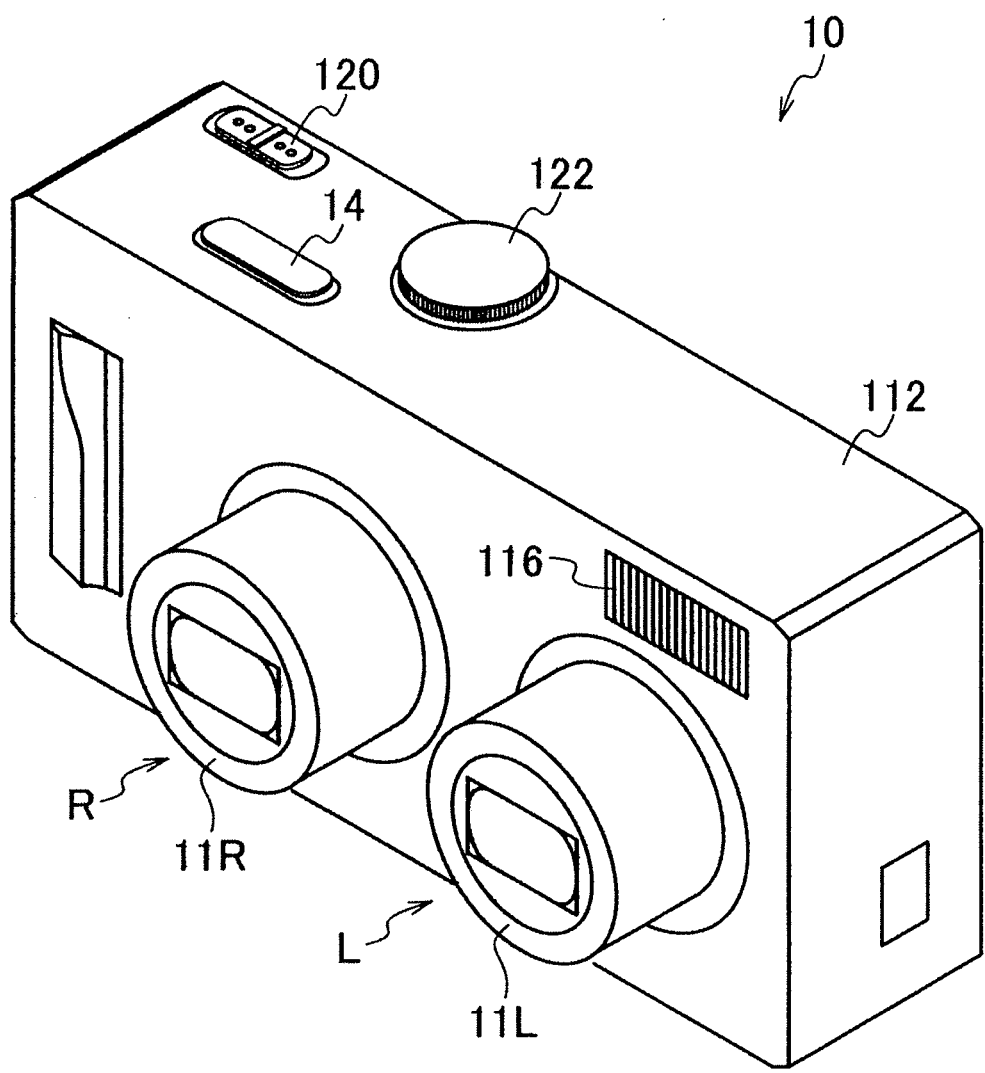
FIG. 1 is a front perspective view of an image capturing device (digital camera) including a stereoscopic image display device according to one embodiment of the present invention.
Figure 2:
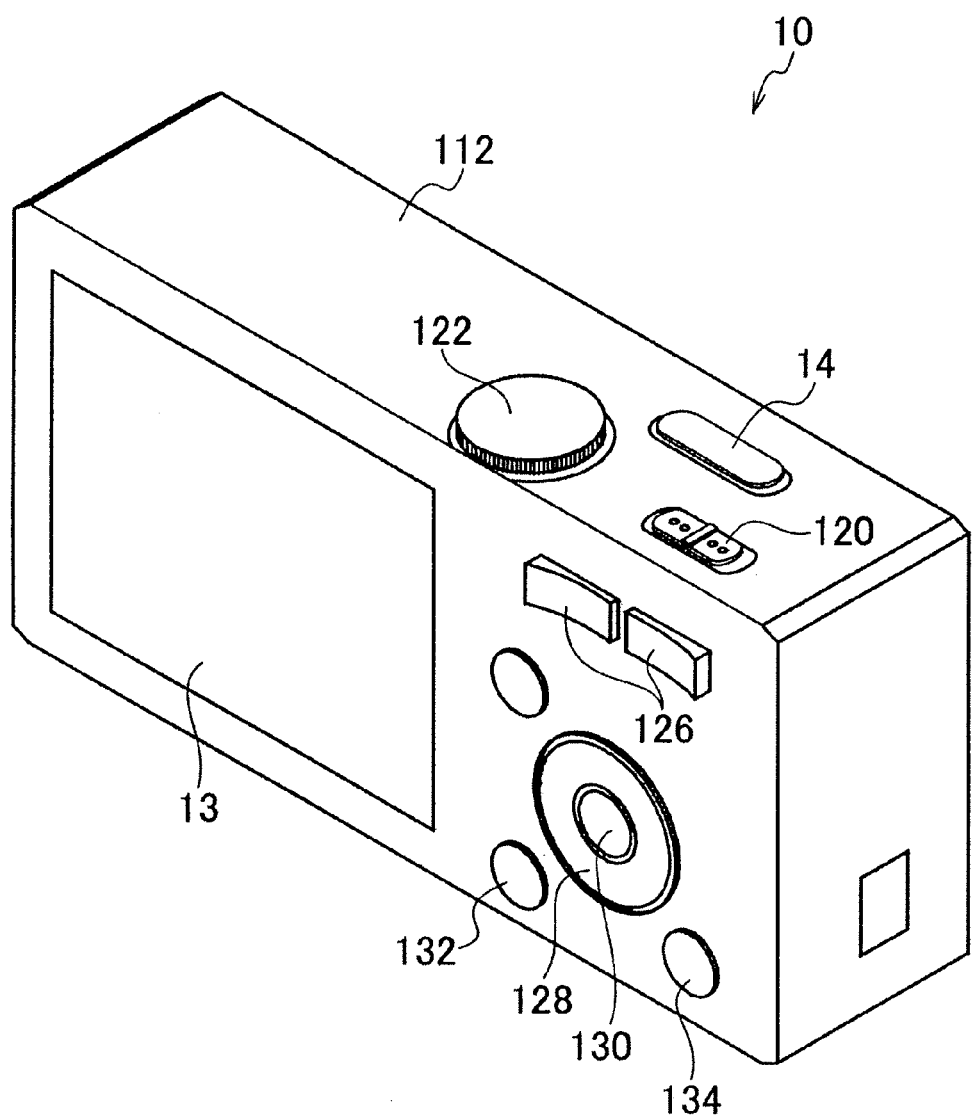
FIG. 2 is a rear perspective view of the image capturing device (digital camera) including the stereoscopic image display device according to the one embodiment of the present invention.

FIG. 1 is a front perspective view illustrating configuration appearance of a digital camera 10 according to one embodiment of a stereoscopic image capturing device of the present invention. FIG. 2 is a rear perspective view illustrating configuration appearance of one example of the digital camera.

The digital camera 10 includes a plurality of image capturing parts (two parts are exemplarily illustrated in FIG. 1), and can capture images of the same subject from a plurality of view points (two view points for the right and left are exemplarily illustrated in FIG. 1). In addition, in this example, the case of including two image capturing parts is exemplarily described for convenience of explanation, whereas the present invention is not limited to this but is also applicable to cases of including three or more image capturing parts similarly.

A camera body 112 of the digital camera 10 of this example is formed into a rectangular box shape, and a pair of image capturing optical systems 11R and 11L and a strobe light 116 are provided on its front face as illustrated in FIG. 1. Moreover, a release button 14, a power/mode switch 120, a mode dial 122 and the like are provided on the top face of the camera body 112. Moreover, a monitor 13 constituted of a liquid crystal display device (LCD: liquid crystal display) and the like, a zoom button 126, a cross button 128, a MENU/OK button 130, a DISP button 132, a BACK button 134 and the like are provided on the rear face of the camera body 112 as illustrated in FIG. 2.

The pair of image capturing optical systems 11R and 11L for the right and left are configured to include retractable lens barrel-type zoom lenses, respectively (18R and 18L in FIG. 3), and upon turning on the power source of the digital camera 10, slide out of the camera body 112. In addition, since the zoom mechanism, retractable lens barrel mechanism, and the like in the image capturing optical system are the known technologies, the specific description of those is herein omitted.

The monitor 13 is a display device such as a color liquid crystal panel on whose front face a so-called lenticular lens having half cylinder-shaped lenses is disposed. This monitor 13 is utilized as an image display part for displaying images having already captured, furthermore, utilized as a GUI (graphical user interface) in configuring variety of settings, and moreover, utilized as an electronic finder in image capturing, performing through-display of an image obtained by an image sensor. In addition, the display method of stereoscopic images on the monitor 13 is not limited to the one using the lenticular lens. For example, a parallax barrier method may be applied, or a display method of stereoscopic images using glasses may be applied (for example, an anaglyph method, polarizing filter method, liquid crystal shutter method or the like).

The release button 14 is configured by a two-stroke switch constituted of so-called "half push" and "full push". At a half push of this release button 14, the digital camera 10 performs image capturing preparation processing, that is, processes of AE (Automatic Exposure), AF (Auto Focus) and AWB (Automatic White Balance) in still image capturing (for example, in selecting a still image capturing mode using the mode dial 122 or via a menu), and at a full push, performs image capturing and recording processing. Moreover, at a full push of this release button 14, video image capturing is started, and again at a full push thereof, the image capturing is ended in video image capturing (for example, in selecting a video image capturing mode using the mode dial 122 or via the menu). In addition, settings can also configure to perform the video image capturing during a full push of the release button 14 and to end the image capturing upon releasing the full push. In addition, a release button exclusively for still image capturing and a release button exclusively for video image capturing may be provided.

The power/mode switch 120 (power switch and mode switch) functions as a power switch of the digital camera 10, and furthermore, functions as a selector switch for switching the digital camera 10 between a playback mode and an image capturing mode. The mode dial 122 is used for configuring the image capturing mode. By setting this mode dial 122 to "2D still image position", the digital camera 10 is configured to a 2D still image capturing mode for capturing still images in 2D, and by setting to "3D still image position", it is configured to a 3D still image capturing mode for capturing still images in 3D. Furthermore, by setting to "3D video image position", it is configured to a 3D video image capturing mode for capturing video images in 3D.

The zoom button 126 is used for zoom operation of the image capturing optical systems 11R and 11L, and constituted of a zoom tele button instructing zooming to the telescopic side and a zoom wide button instructing zooming to the wide-angle side. The cross button 128 is provided capable of pushing operations for four directions of the top, bottom, right and left, and functions according to setting status of the camera are assigned to the pushing operations for the respective directions. The MENU/OK button 130 is used for calling a menu screen (MENU function), and furthermore, used for confirming the content of selection, instructing the execution of processing and the like (OK function). The DISP button 132 is used for input of switching instruction of the content of displaying on the monitor 13 and the like. The BACK button 134 is used for input of instruction of the cancellation of input operation and the like.

Figure 3A:
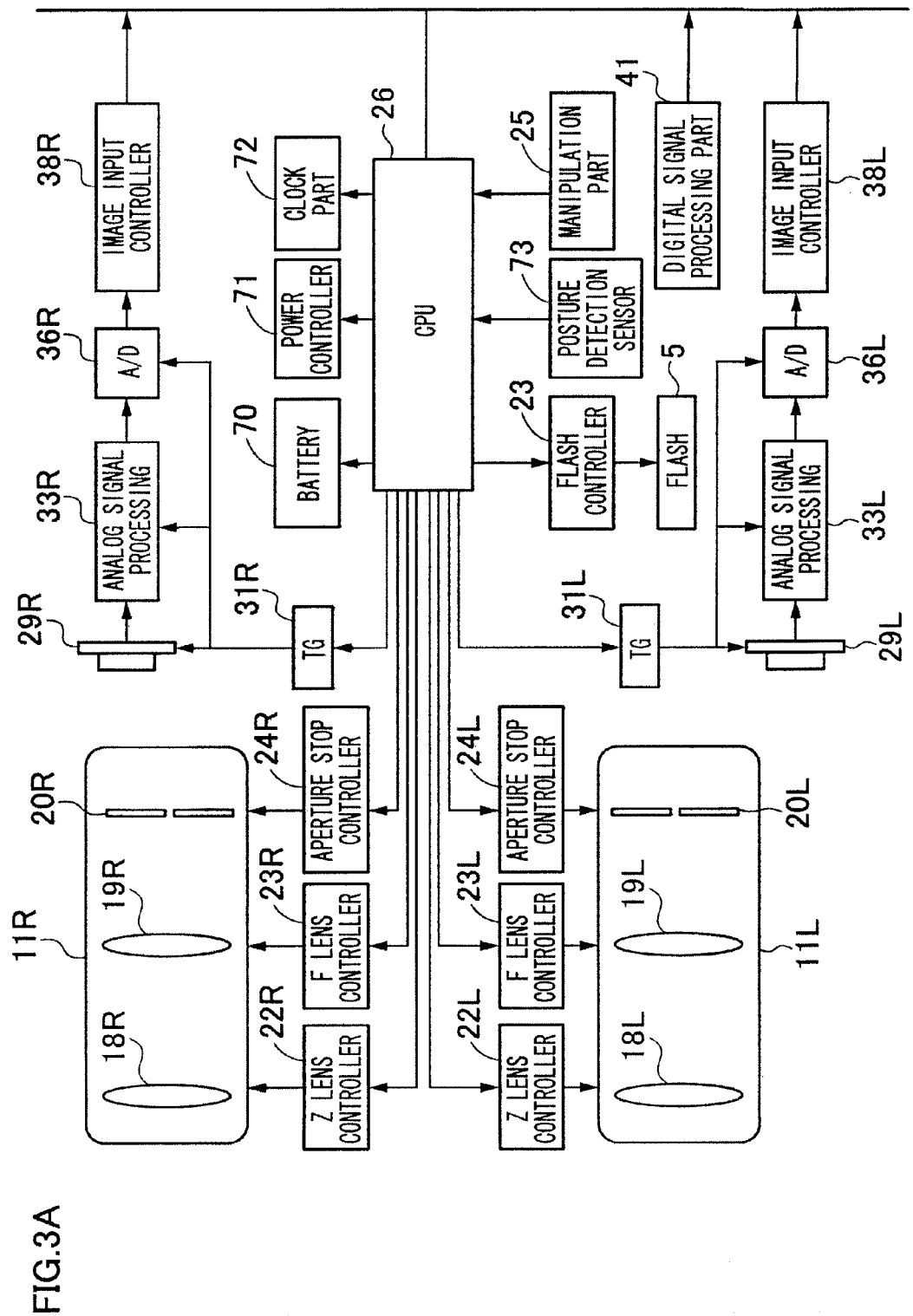
FIG. 3A is a block diagram of the image capturing device (digital camera) including the stereoscopic image display device according to the one embodiment of the present invention.
Figure 3B:
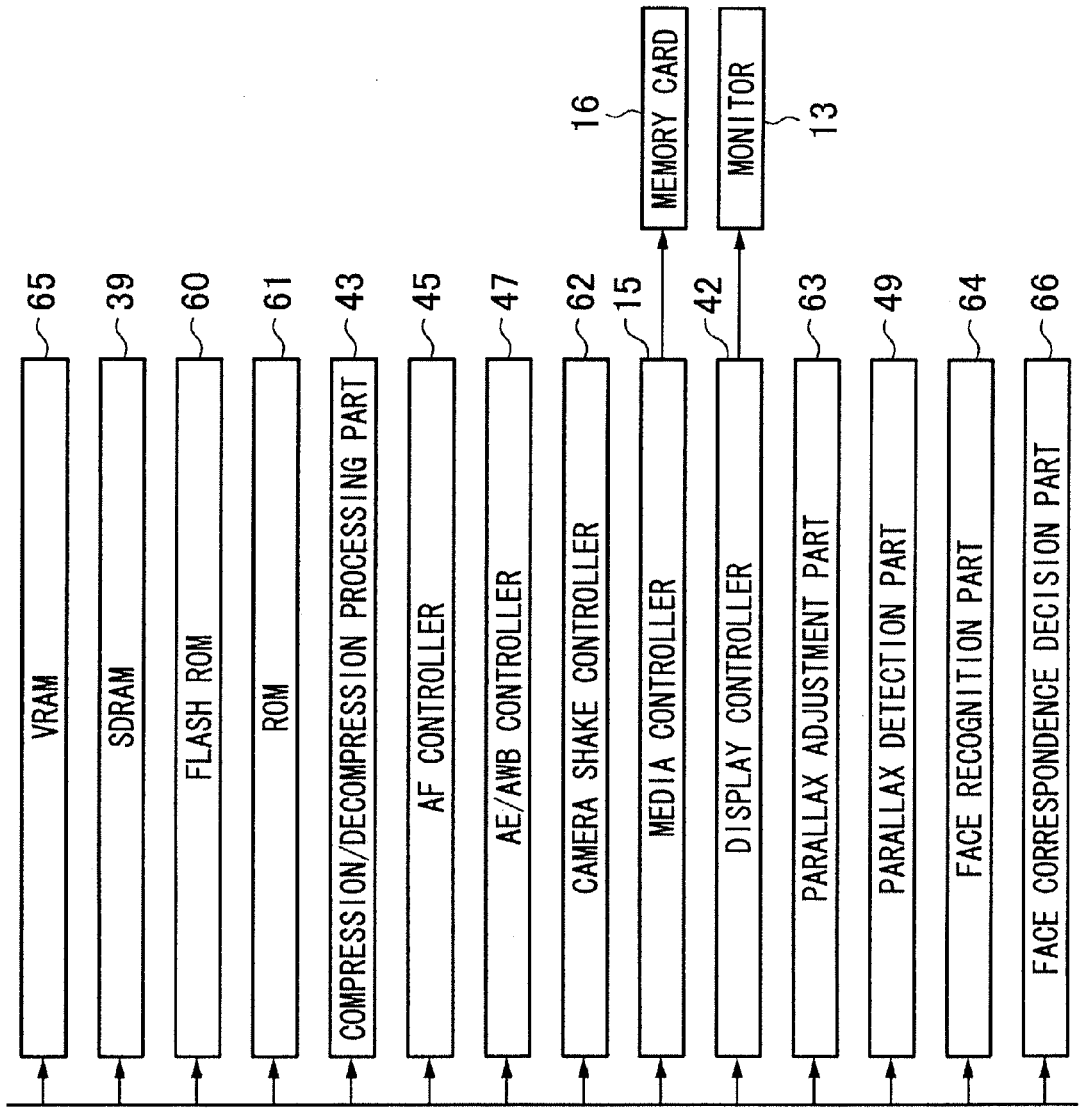
FIG. 3B is a block diagram of the image capturing device (digital camera) including the stereoscopic image display device according to the one embodiment of the present invention.

FIG. 3A and FIG. 3B are block diagrams illustrating the essential portion of the digital camera 10.

The digital camera 10 includes an image capturing part for the right view point having the image capturing optical system 11R for the right view point and an image sensor 29R, and an image capturing part for the left view point having the image capturing optical system 11L for the left view point and an image sensor 29L.

The two image capturing optical systems 11 (11R and 11L) includes zoom lenses 18 (18R and 18L), focus lenses 19 (19R and 19L) and aperture stops 20 (20R and 20L), respectively. These zoom lenses 18, focus lenses 19 and aperture stops 20 are driven by zoom lens controllers 22 (22R and 22L), focus lens controllers 23 (23R and 23L) and aperture stop controllers 24 (24R and 24L), respectively. Each of the controllers 22, 23 and 24 is constituted of a stepping motor, and controlled according to driving pulses given from a not-shown motor driver connected to a CPU 26.

Behind the two image capturing optical systems 11 (11R and 11L), CCD (charge-coupled device) image sensors (hereinafter, referred to simply as "CCDs") 29 (29R and 29L) are disposed, respectively. In addition, in place of the CCD 29, a MOS (metal-oxide semiconductor) type image sensor may be used. As is well known, the CCD 29 has a photoelectric conversion plane in which a plurality of photoelectric conversion elements are arranged, and by subject light being incident on this photoelectric conversion plane via the image capturing optical system 11, the subject image is imaged. Timing generators: TGs 31 (31R and 31L) controlled by the CPU 26 are connected to the CCDs 29, and based on timing signals (clock pulses) inputted from these TGs 31, the shutter speed of the electronic shutter (charge accumulation time of each photoelectric conversion element) is determined.

Imaging signals outputted from the CCDs 29 are inputted to analog signal processing circuits 33 (33R and 33L). The analog signal processing circuit 33 has a correlative double sampling circuit (CDS), an amplifier (AMP), an A/D converter and the like. The CDS generates image data of R (red), G (green) and B (blue) corresponding to accumulated charge times of individual pixels from the image signal. The AMP amplifies the generated image data. The A/D converter performs analog-to-digital conversion on the amplified image data.

The AMP functions as a sensitivity adjustment device adjusting sensitivity of the CCD 29. ISO sensitivity (International Organization for Standardization) of the CCD 29 is determined from the gain of the AMP. Then, the digital image data outputted from the A/D converters 36 (36R and 36L) are temporarily stored as right view point image data and left view point image data, respectively, in an SDRAM (synchronous dynamic random access memory) 39 as a working memory via image input controllers 38 (38R and 38L).

A digital signal processing part 41 reads out the image data from the SDRAM 39, and performs various kinds of image processing such as gradation conversion, white balance correction, gamma correction processing and YC conversion processing thereon, and this image data is stored again in the SDRAM 39. The image data having already undergone the image processing performed by the digital signal processing part 41 is acquired into a VRAM (video random access memory) 65 as a through-image, and after that, is converted into an analog signal for visual output by a display controller 42 to be displayed on the monitor 13. Moreover, the image data having already undergone the image processing which is acquired upon a full push of the release button 14 is compressed in a predetermined compression format (for example, JPEG (Joint Photographic Experts Group) format) by a compression/decompression processing part 43, and after that, is recorded in a memory card 16 as an image for recording via a media controller 15.

A manipulation part 25 is for a variety of operations of the digital camera 10, and includes the various buttons and switches 120 to 134 illustrated in FIG. 1 and FIG. 2.

The CPU 26 is provided in order to integrally control the digital camera 10. The CPU 26 controls individual parts such as a battery 70, a power source controller 71 and a clock part 72 based on programs for various kinds of controls and setting information stored in a flash ROM (read-only memory) 60, a ROM 61 and the like, input signals from the a posture detection sensor 73, the manipulation part 25 and the like, and the like.

Moreover, the digital camera 10 is provided with an AE/AWB controller 47 performing AE (Auto Exposure)/AWB (Auto White Balance) control, and a parallax detection part 49 performing parallax detection on face regions. Moreover, the digital camera 10 includes a flash controller 23 controlling flash timing, flash amount and the like of the flash 5.

The AE/AWB controller 47 analyzes the image (captured image) obtained by the CCD 29 at the time of a half push of the release button 14, and calculates an aperture value of the aperture stop 20 and a shutter speed of the electronic shutter of the CCD 29 based on brightness information and the like of the subject. Then, based on these calculation results, the AE/AWB controller 47 controls the aperture value via the aperture stop controller 24, and controls the shutter speed via the TG 31.

For example, aperture values and shutter speeds of both of the image capturing optical systems 11R and 11L are calculated based on a captured image obtained by the CCD 29R or 29L of one image capturing optical system out of the two image capturing optical systems 11R and 11L (right view point image or left view point image). The aperture values and shutter speeds of the respective image capturing optical systems 11R and 11L may also be calculated based on captured images obtained by both of the image capturing optical systems 11R and 11L (right view point image and left view point image).

The AF controller 45 performs AF search control of calculating a contrast value by moving the focus lenses 19R and 19L along the light axis direction, and in-focus control of moving the focus lenses 19R and 19L to in-focus lens positions based on the contrast value at the time of a half push of the release button 14. Herein, the "contrast value" is calculated based on the captured images obtained by the CCDs 29R and 29L. The "in-focus lens positions" are the positions of the focus lenses 19R and 19L at which the focus lenses 19R and 19L focus at least on the primary subject.

For example, the contrast value is calculated based on the captured image of either the image capturing optical system 11R or 11L (right view point image or left view point image) while shifting at least one of the focus lenses 19R and 19L of the two image capturing optical systems 11R and 11L by driving of the motor driver 27R or 27L. Based on the contrast value, the in-focus lens positions of the focus lenses 19R and 19L of the two image capturing optical systems 11R and 11L are determined, respectively, and the individual focus lenses 19R and 19L are moved to the respective in-focus lens positions by driving the motor drivers 27R and 27L, respectively. In addition, the AF search may be performed for both of the image capturing optical systems 11R and 11L, and thereby, the respective in-focus lens positions may be determined.

The posture detection sensor 73 detects a direction and an angle in which and by which the image capturing optical systems 11R and 11L are rotated relative to a beforehand determined posture.

The camera shake controller 62 corrects a deflection of the light axis detected by the posture detection sensor 73 to prevent camera shake, by driving not-shown correction lenses provided in the image capturing optical systems 11R and 11L using motors.

The CPU 26 controls a face recognition part 64 to perform face recognition based on right and left image data corresponding to subject images of the image capturing optical systems 11R and 11L. The face recognition part 64 starts face recognition according to the control of the CPU 26, performing the face recognition from the right and left image data. The face recognition part 64 stores face region information including position information of face regions respectively recognized from the right and left image data as the result of the face recognition in the SDRAM 39. The face recognition part 64 can recognize face regions from images stored in the SDRAM 39 using a known method such as template matching. In addition, the face region of the subject can include a face region of a person or animal in a captured image.

A face correspondence decision part 66 decides a correspondence relation between the face region recognized from the right image data and the face region recognized from the left image data. Namely, the face correspondence decision part 66 identifies a set of the face regions for which pieces of position information of the face regions recognized from the respective right and left image data are closest to each other. Then, the face correspondence decision part 66 performs matching of pieces of image information of the face regions constituting the relevant set to each other. When the reliability of identity between both exceeds a predetermined threshold value, it is decided that the face regions constituting the relevant set are in correspondence relation to each other.

The parallax detection part 49 calculates a parallax between the relevant face regions based on both of the pieces of position information of the face regions decided as being in the correspondence relation. The parallax detection part 49 repeats the calculation of the parallax for each set of face regions decided as being in correspondence relation, and stores this parallax for each set of the face regions in the SDRAM 39.

For example, the calculation of the parallax between face regions in correspondence relation is performed as follows. At first, the parallax detection part 49 calculates differences in positions between specific points (correspondence points) corresponding between the face regions constituting the set (distance between the correspondence points). Then, the parallax detection part 49 calculates an average value of parallaxes between the points included in the relevant set of the face regions, and sets this as the parallax of the relevant set. The position information of the face regions in correspondence relation and the parallax thereof are stored in association with the right and left image data in the SDRAM 39. For example, the position information of the face regions in correspondence relation and the parallax thereof are stored as additional information of the image data (headers, tags, meta information, or the like). When the image data are compressed and stored as images for recording in the memory card 16, the position information of the face regions in correspondence relation and the information regarding the parallax thereof are stored in additional information of the images for recording, integrating this position information and parallax of the face regions together as tag information of Exif (Exchangeable image file format) or the like, for example. Needless to say, when any face regions are not in the image data, or when, even if face regions exist, they are not in correspondence relation, such information is not stored.

Figure 4:
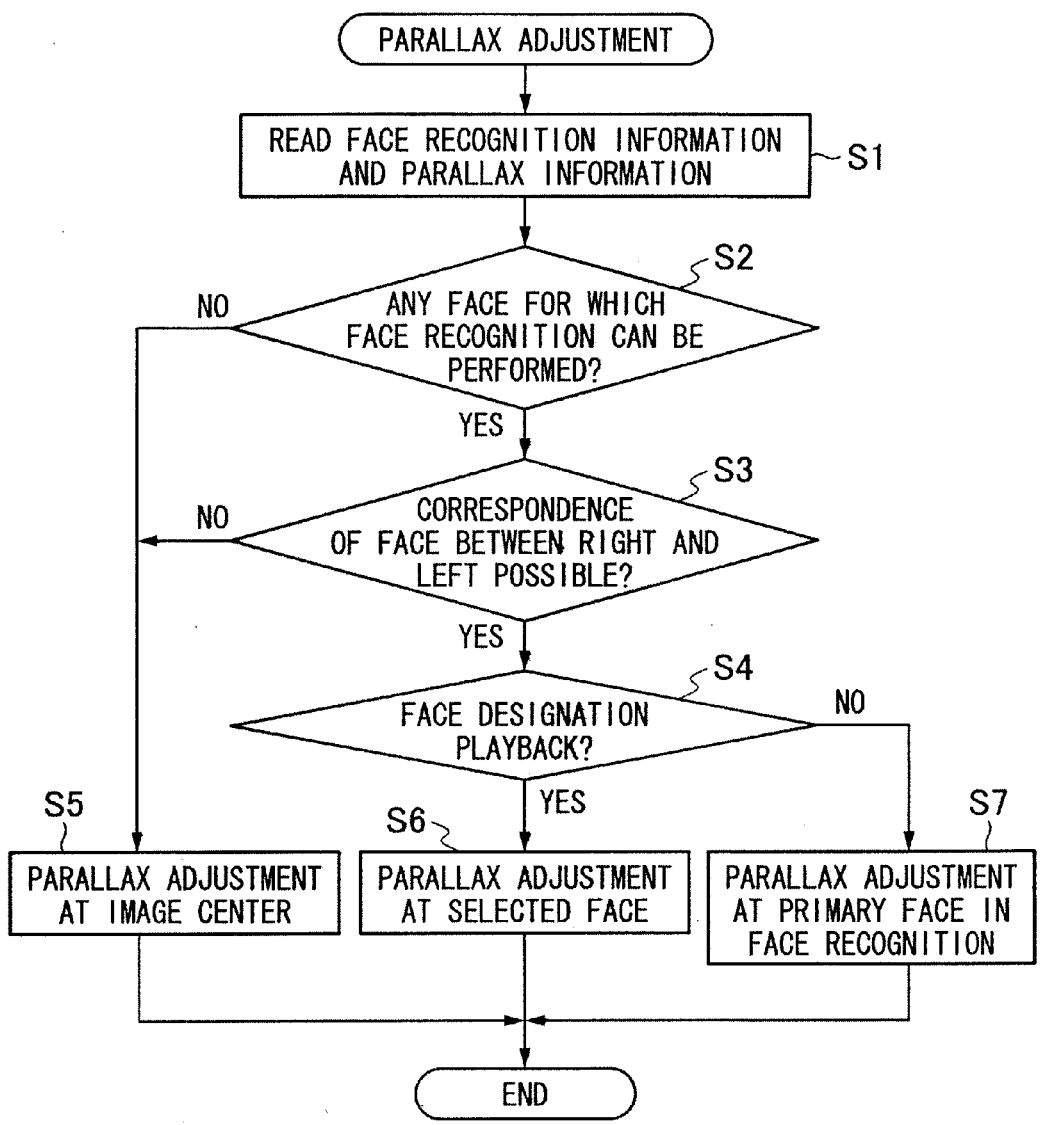
FIG. 4 is a flowchart of display processing according to a first embodiment.

FIG. 4 illustrates a flowchart of display processing according to a first embodiment. This processing is controlled by the CPU 26. A program causing the CPU 26 to perform this processing is stored in a computer-readable recording medium such as the ROM 61. This processing is performed after the above-mentioned position information and parallax of the face regions are stored in the additional information of the image data.

Figure 5:
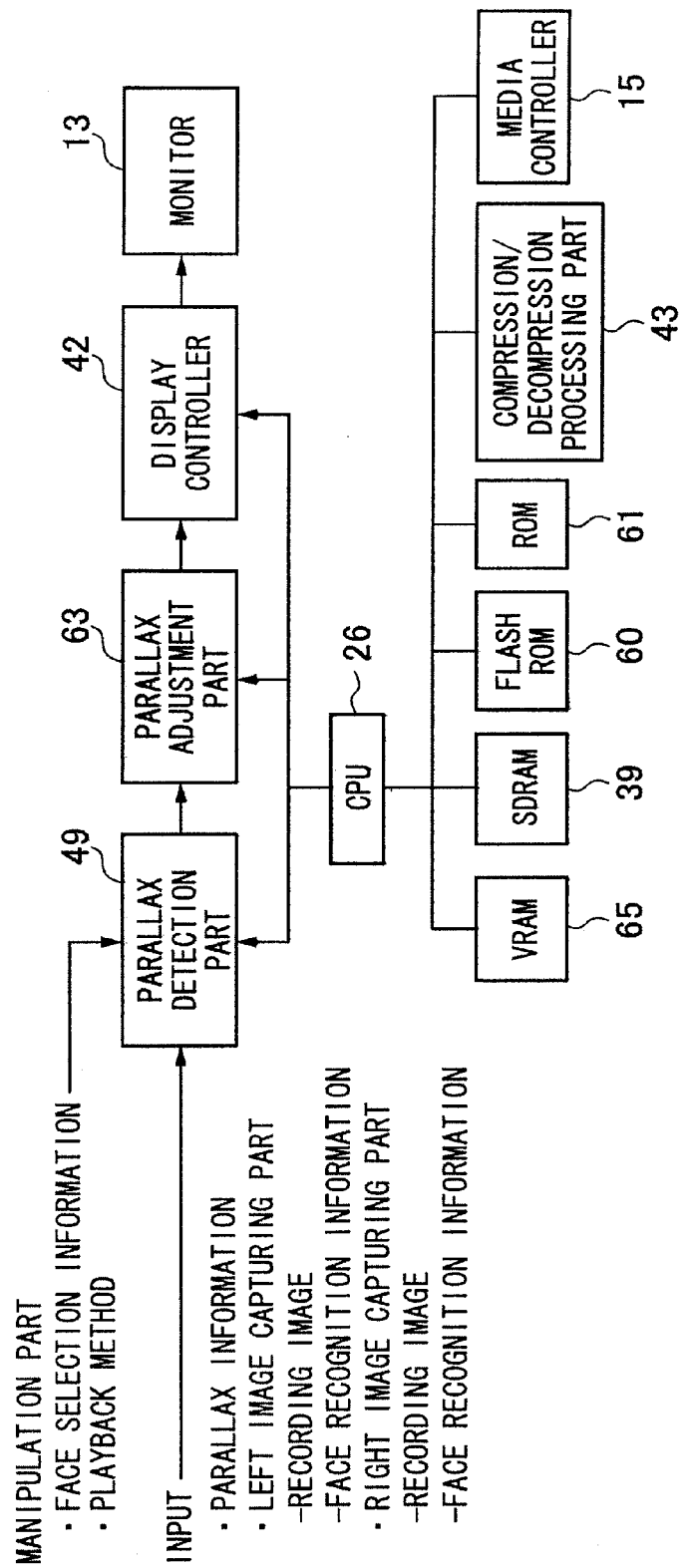
FIG. 5 is a block diagram of the essential portion of a display playback device.

In addition, blocks required for performing this processing may be stored in electronic equipment other than the digital camera. For example, a display playback device may perform this processing which includes blocks for displaying planar or stereoscopic images which blocks include the CPU 26, VRAM 65, SDRAM 39, flash ROM 60, ROM 61, compression/decompression processing part 43, media controller 15, parallax detection part 49, parallax adjustment part 63, display controller 42, monitor 13, or the like as illustrated in FIG. 5.

In S1, the CPU 26 tries to read out position information and a parallax of face regions in correspondence relation from right and left image data stored in the SDRAM 39 or memory card 16 and additional information of the relevant image data.

In S2, the CPU 26 determines whether or not the position information of the face regions is read out successfully. In the case of Yes, the flow proceeds to S3, and in the case of No, the flow proceeds to S5.

In S3, the CPU 26 determines whether or not parallax information corresponding to the position information of the set of the face regions is read out successfully. In the case of Yes, the flow proceeds to S4, and in the case of No, the flow proceeds to S5.

In S4, the CPU 26 accepts a playback method of the image such as "normal playback", "face selection playback", "face expansion playback" and "slideshow".

When "face selection playback" or "face expansion playback" is selected as a playback method for face expansion playback, the CPU 26 allows the manipulation part 25 further to select a desired face for which parallax adjustment is expected. The CPU 26 stores information indicating the face selected from the manipulation part 25 as face selection information in the SDRAM 39. The CPU 26 may accept selection of the desired face information from among face information displayed in a list via the manipulation part 25. For example, after the selection of the playback method of the image, the CPU 26 displays the image data for any of the right and left as a planar image, and from among face regions in the relevant image, displays, in the list, face regions in correspondence relation in the right and left image data as planar images or stereoscopic images.

When "slideshow" is selected as a playback method for face expansion playback, the CPU 26 gives display orders without overlapping, as the face selection information, to individual pieces of face information, and the display orders for individual faces are stored as the face selection information in the SDRAM 39. The display orders may be given automatically or manually. For example, the CPU 26 gives the display orders in ascending order or descending order of image capturing time and date stored in the additional information of the image data. Otherwise, the CPU 26 gives the display orders according to instruction for display order via the manipulation part 25.

When "face expansion playback" or "slideshow" is selected as a playback method for face expansion playback, the flow proceeds to S6, otherwise to S7.

Figure 6A:
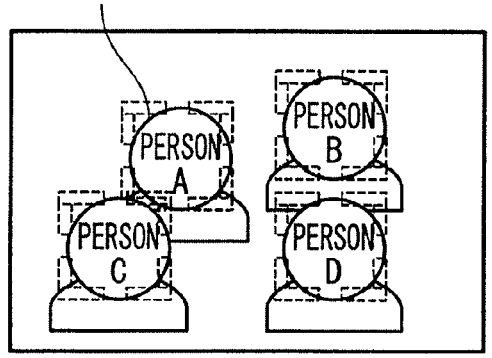
FIG. 6A is a diagram illustrating a display example of a stereoscopic image according to the first embodiment.

In S5, the CPU 26 instructs the parallax adjustment part 63 to perform parallax adjustment, setting the screen center as a reference. The parallax adjustment part 63 adjusts a parallax amount of the right and left image data such that a cross point is configured to the screen center, and displays a stereoscopic image on the monitor 13 via the display controller 42. FIG. 6A is a display example of this stereoscopic image.

In S6, the CPU 26 instructs the parallax adjustment part 63 to perform parallax adjustment of the right and left image data, setting the selected face region indicated by the face selection information as a reference. The parallax adjustment part 63 adjusts a parallax amount of the right and left image data such that a cross point is configured to the selected face region, and displays a stereoscopic image on the monitor 13 via the display controller 42.

Figure 6B:
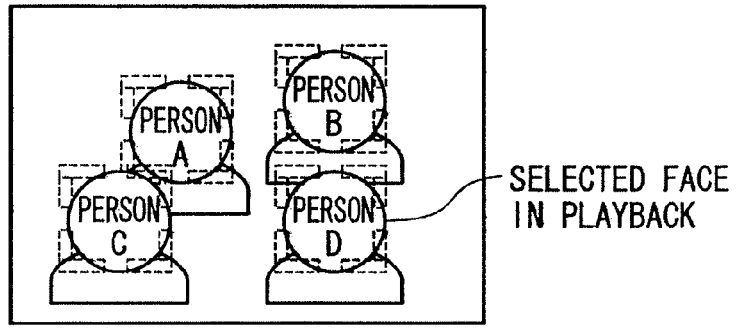
FIG. 6B is a diagram illustrating a display example of a stereoscopic image according to the first embodiment.

When "face selection playback" is selected, the CPU 26 instructs the parallax adjustment part 63 to perform parallax adjustment of the right and left image data, setting the parallax information corresponding to the selected face region as a reference. The parallax adjustment part 63 adjusts a parallax amount of the right and left image data such that a cross point is configured to the selected face region, and performs stereoscopic display of the right and left image data, for which relevant parallax adjustment is completed, on the monitor 13 via the display controller 42. FIG. 6B is a display example of this stereoscopic image, and the cross point is configured to face D.

Figure 6C:
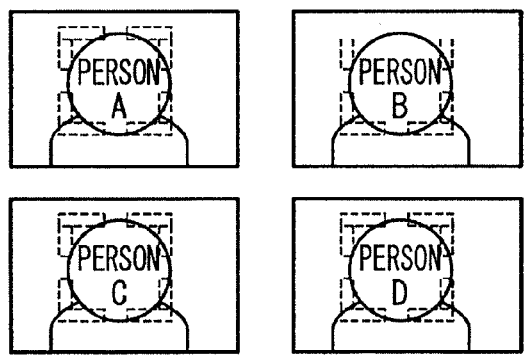
FIG. 6C is a diagram illustrating a display example of a stereoscopic image according to the first embodiment.

When "face expansion playback" is selected, the CPU 26 cuts out the selected face region indicated by the face selection information from the right and left image data. Then, the CPU 26 instructs the parallax adjustment part 63 to perform parallax adjustment of the relevant cut-out face region, setting the parallax information corresponding to the selected face region as a reference. The parallax adjustment part 63 adjusts a parallax amount of the relevant cut-out face region such that a cross point is configured to the selected face region, and displays a stereoscopic image of the relevant cut-out face region on the monitor 13 via the display controller 42. At this stage, the display controller 42 expands the face region until it reaches the periphery of the display region of the monitor 13. FIG. 6C illustrates display examples of the stereoscopic image in the case of face regions for which faces A to D are respectively selected.

In addition, there is a possibility that a stereoscopic display region is reduced due to reduction of the common region between the cut-out image data when the parallax adjustment is performed after cutting out the face region from the right and left image data. Therefore, it is preferable that, at first, the parallax adjustment part 63 adjusts the parallax amount such that the cross point is configured to the selected face region. Then, it is preferable that the CPU 26 cuts out the face region from the right and left image data after the parallax adjustment and that the display controller 42 displays the relevant cut-out face region from the right and left image data having undergone the parallax adjustment on the monitor 13.

When "slideshow" is selected, the CPU 26 sequentially cuts out each face region from the right and left image data one by one according to the display order indicated by the face selection information. Then, the CPU 26 instructs the parallax adjustment part 63 to perform parallax adjustment of the relevant cut-out face region, setting the parallax information corresponding to the relevant cut-out face region as a reference. The parallax adjustment part 63 adjusts a parallax amount of the relevant cut-out face region such that a cross point is configured to the selected face region, and displays a stereoscopic image of the relevant cut-out face region on the monitor 13 via the display controller 42. By repeating this for all of the individual face regions according to the display order, the slideshow is performed, sequentially switching the face regions which undergo stereoscopic display. At this stage, the display controller 42 may expand and display each face region until it reaches the periphery of the display region of the monitor 13.

In S7, the CPU 26 instructs the parallax adjustment part 63 to perform parallax adjustment, setting the primary face region as a reference. The parallax adjustment part 63 adjusts a parallax amount of the right and left image data such that a cross point is configured to the selected face region, and displays a stereoscopic image on the monitor 13 via the display controller 42. For example, the primary face region is a face region present at the position closest to the screen center, or a face region largest in size, or a face region highest in order.

According to the processing above, information of face regions in correspondence relation and parallax information thereof which are stored beforehand are read out along with images, and after that, parallax adjustment is performed according to face selection information in playback and a parallax of a selected face and a stereoscopic image is displayed according to a selected playback method. Accordingly, as to a stereoscopic image containing a plurality of faces, stereoscopic vision in which a parallax is optimized for a target face and which is natural and less in load on eyes can be displayed.

Second Embodiment

FIG. 7 illustrates a flowchart of display processing according to a second embodiment. This processing is controlled by the CPU 26. A program causing the CPU 26 to perform this processing is stored in a computer-readable recording medium such as the ROM 61. This processing is performed after the above-mentioned position information and parallax of the face regions are stored in the additional information of the image data. This processing may also be performed by the display playback device in FIG. 5.

S11 to S13 are same as S1 to S3, respectively.

In S14, the CPU 26 determines whether or not a playback method of either "index display" or "partition display" is selected by the user via the manipulation part 25. "Index display" is a method of displaying, in a list, all of the faces in the image data, and after that, displaying a face arbitrarily selected from among the faces in a display region of the monitor 13 except in the list. "Partition display" is a playback method of partitioning the display region of the monitor 13 into the number of face regions and performing stereoscopic display of the individual face regions in the image data in the corresponding partition screens. When "index display" is selected, the flow proceeds to S15, and when "partition display" is selected, the flow proceeds to S22.

In S15, supposing that the total number of face regions in correspondence relation is N, the CPU 26 decides that the number of the screen partition is N+1. The CPU 26 accepts selection of a desired face region. The selection may be either done manually according to user operation or the like or done automatically according to an order of the face regions. Such predetermined order is such as an order for face recognition performed by the face recognition part 64. In the case of the user operation, it is preferable to display, in a list, all of the faces in the image data in the respective display regions of partition screens in the monitor 13 and to allow selection of a face region from among them. The CPU 26 may display the face region selected from the list as a stereoscopic image and the face regions not selected from the list as planar images. By doing so, the face region high in attention can be shown more effectively. This list may include either planar images or stereoscopic images. However, when displayed as stereoscopic images, parallax adjustment is performed individually for each face region.

The CPU 26 cuts out the selected face region from each of the right and left image data according to the position information of the face regions read in S11.

In S16, the CPU 26 instructs the parallax adjustment part 63 to perform parallax adjustment of the relevant cut-out face region, setting the parallax information corresponding to the relevant cut-out face region as a reference. The parallax adjustment part 63 adjusts a parallax amount of the relevant cut-out face region such that a cross point is configured to the selected face region.

In S17, the CPU 26 displays a stereoscopic image of the relevant cut-out face region on the monitor 13 via the display controller 42. The stereoscopic image of the face region is displayed at the position of the partition screen different from the N partition screens in which the above-mentioned list of the face regions is displayed. As the result, a screen as in FIG. 8D is displayed on the monitor 13.

In S18, the CPU 26 determines whether or not the processing in S15 to S18 is completed for all of the face regions and stereoscopic display is made for all of the face regions. For example, this determination is made based on whether or not the number of loops of the processing in S15 to S18 is equal to or greater than the number of the recognized face regions. In the case of Yes, the flow proceeds to S19, and in the case of No, the flow returns to S15.

In S19, the CPU 26 instructs the parallax adjustment part 63 to adjust a parallax amount of the right and left image data, setting the primary face region as a reference. For example, the primary face region is a face region present at the position closest to the screen center, or a face region largest in size, or a face region highest in order of evaluation values for face-likelihood during face recognition.

In S20, the parallax adjustment part 63 adjusts a parallax amount of the right and left image data such that a cross point is configured to the primary face region, and displays a stereoscopic image on the monitor 13 via the display controller 42. As the result, as in FIG. 8C, the relevant stereoscopic image is displayed in the partition screen except in the list of the face regions. Otherwise, a screen as in FIG. 8A may be displayed on the monitor 13.

In S21, the CPU 26 instructs the parallax adjustment part 63 to perform parallax adjustment, setting the screen center as a reference. The parallax adjustment part 63 adjusts a parallax amount of the right and left image data such that a cross point is configured to the screen center, and displays a stereoscopic image on the monitor 13 via the display controller 42.

In S22, the CPU 26 decides that the number of the screen partition is the total number N of face regions in correspondence relation. The CPU 26 instructs to cut out each of the face regions in correspondence relation from the right and left image data, and after that, to display the cut-out face regions, after parallax adjustment of each, in the above-mentioned number of the partition screens which are independent from one another. The parallax adjustment part 63 adjusts a parallax amount of the right and left image data such that a cross point is configured to each of the face regions in the partition screens, and displays a stereoscopic image of each face region for each partition screen on the monitor 13 via the display controller 42. As the result, a screen as in FIG. 8B is displayed on the monitor 13.

In S23, the CPU 26 accepts selection of ending the processing or not from the manipulation part. In the case of Yes, the processing is ended, and in the case of No, the flow returns to S11.

In addition, as mentioned above, there is a possibility that a stereoscopic display region is reduced due to reduction of the common region between the cut-out image data when the parallax adjustment is performed after cutting out the face region from the right and left image data. Therefore, in S22, it is preferable that the parallax adjustment is performed on each face region for the right and left image data and each face region after the parallax adjustment is cut out from the right and left image data to be displayed in each partition screen.

Figure 8A:
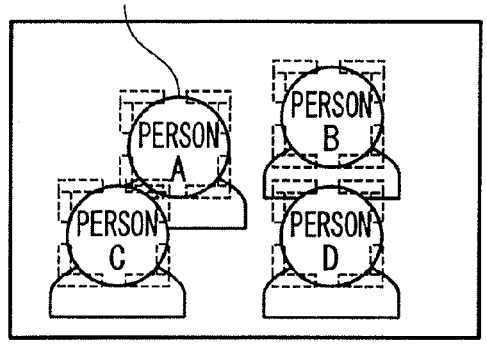
FIG. 8A is a diagram illustrating a display example of a stereoscopic image according to the second embodiment.
Figure 8B:
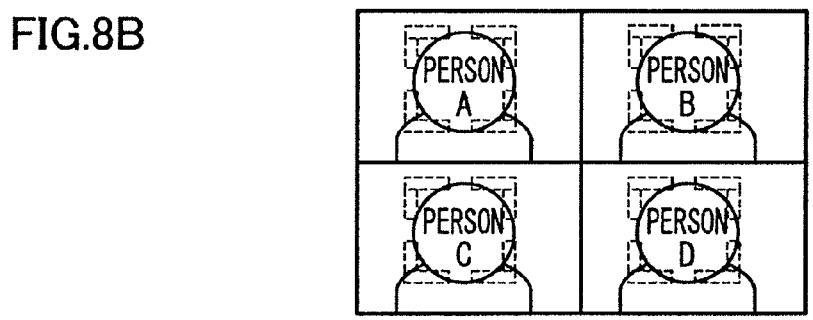
FIG. 8B is a diagram illustrating a display example of a stereoscopic image according to the second embodiment.
Figure 8C:
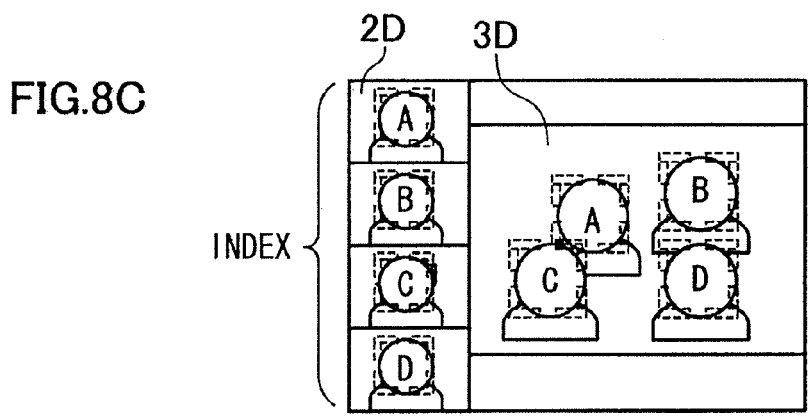
FIG. 8C is a diagram illustrating a display example of a stereoscopic image according to the second embodiment.
Figure 8D:
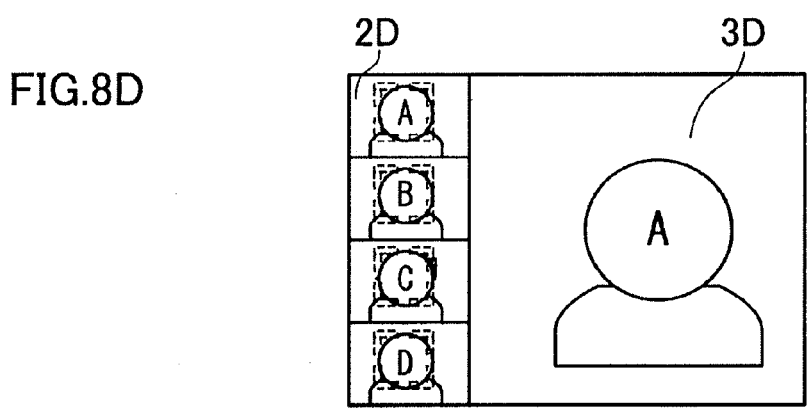
FIG. 8D is a diagram illustrating a display example of a stereoscopic image according to the second embodiment.

FIG. 8A to FIG. 8D illustrate display examples according to this processing. As illustrated in FIG. 8A, when the whole image is displayed in the whole display region of the monitor 13, the parallax adjustment is performed, setting the primary face region as a reference (S19). In addition, also when no face region is selected from the list, display similar to this may be performed. Moreover, as illustrated in FIG. 8B, when each face region is cut out and each face region is displayed in a partition screen, a parallax for each partition screen is adjusted, setting the parallax of each face region as a reference (S22). Moreover, as illustrated in FIG. 8C, while individual faces are displayed, in a list, in partition screens, the whole image is displayed in the entirety of the remaining one partition screen of the monitor 13 (S20). The parallax adjustment of the list can be performed similarly to the case of the partition screen. Moreover, as illustrated in FIG. 8D, when a specific face region is selected from the list, the face region which has undergone the parallax adjustment, setting the face region selected from the list as a reference, is displayed in the remaining partition screen except in the list (S15 to S17).

When "partition display" is selected in the above-mentioned processing, the parallax is adjusted for each of faces in individual display planes obtained by screen partition. A stereoscopic image can be displayed in which none of the faces is given a double image and which is natural and less in load on eyes, and visibility in multi-screen is improved.

When "index display" is selected in the above-mentioned processing, as in FIG. 8C or FIG. 8D, a large screen and small screens are displayed in combination. Herein, 2D display and 3D display are selectively used for each partition screen. Accordingly, a screen high in attention can be shown more efficiently.

Third Embodiment

Figure 9:
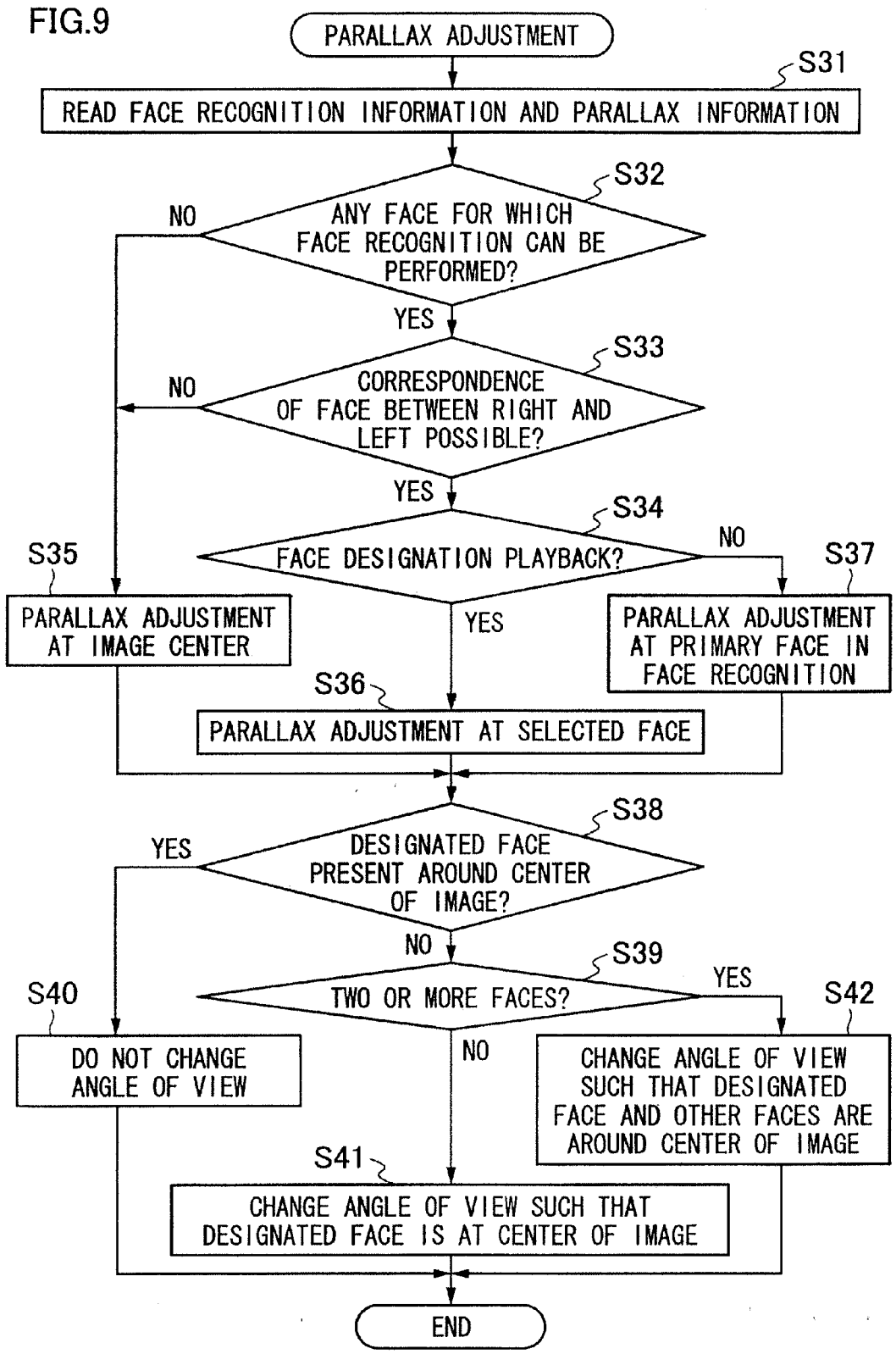
FIG. 9 is a flowchart of display processing according to a third embodiment.

FIG. 9 illustrates a flowchart of display processing according to a third embodiment. This processing is controlled by the CPU 26. A program causing the CPU 26 to perform this processing is stored in a computer-readable recording medium such as the ROM 61. This processing is performed after the above-mentioned position information and parallax of the face regions are stored in the additional information of the image data. This processing may also be performed by the display playback device in FIG. 5.

S31 to S37 are same as S1 to S7, respectively.

In S38, the CPU 26 determines whether or not the face region selected by the user is present around the center of the right and left image data. In the case of Yes, the flow proceeds to S40, and in the case of No, to S39.

In S39, the CPU 26 determines whether or not two or more face regions are present in the image. In the case of Yes, the flow proceeds to S42, and in the case of No, to S41.

S40 is same as S35.

In S41, the CPU 26 cuts out a region corresponding to the aspect of the display region of the monitor 13 from the right and left image data such that the face region selected by the user is present around the center of the image. Then, the CPU 26 controls the parallax adjustment part 63 to adjust the parallax amount, setting the center of the cut-out region as a reference, and controls the display controller 42 to display the relevant cut-out region as a stereoscopic image on the monitor 13.

In S42, the CPU 26 configures cutting-out frames having a predetermined size and aspect in the right and left images such that the face region selected by the user and the other face regions are present around the centers of the images. Furthermore, the CPU 26 configures the position of the cutting-out frame such that the face region selected by the user is contained within the cutting-out frame. The CPU 26 cuts out a partial region of the image in the cutting-out frame. Then, the CPU 26 adjusts the parallax amount, setting the center of the cut-out region as a reference, and displays the relevant cut-out region as a stereoscopic image on the monitor 13. The size of the cut-out region is smaller than the size of the display region of the monitor 13, and for example, 70-50% of the size of the display region of the monitor 13. The aspect ratio of the cut-out region is same as the aspect ratio of the display region of the monitor 13.

In addition, as mentioned above, there is a possibility that a stereoscopic display region is reduced due to reduction of the common region between the cut-out image data when the parallax adjustment is performed after cutting out the image from the right and left image data. Therefore, in S42, it is preferable that the parallax adjustment is performed on the right and left image data, setting the center of the cutting-out frame as a reference, and that the region in the cutting-out frame is cut out from the right and left image data after the parallax adjustment to be displayed.

Figure 10A:
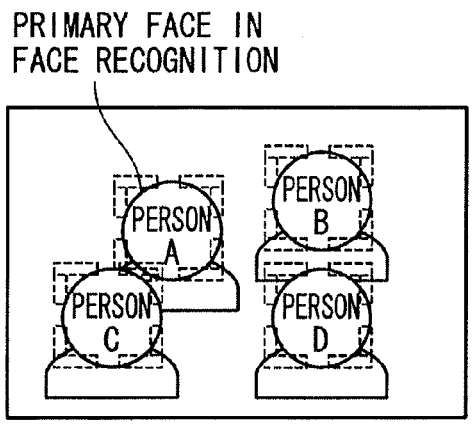
FIG. 10A is a diagram illustrating a display example of a stereoscopic image according to the third embodiment.
Figure 10B:
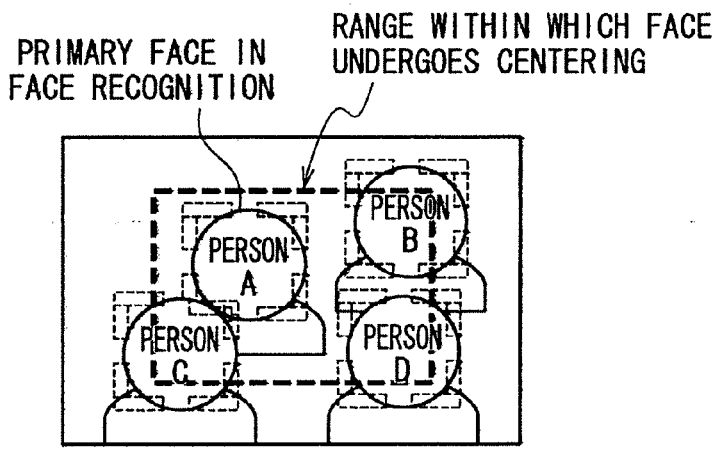
FIG. 10B is a diagram illustrating a display example of a stereoscopic image according to the third embodiment.
Figure 10C:
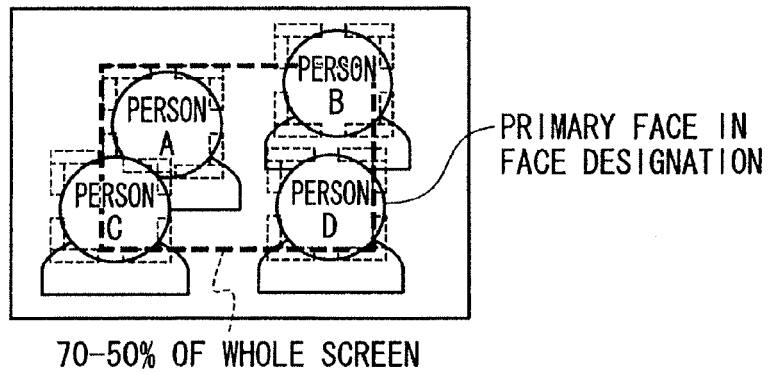
FIG. 10C is a diagram illustrating a display example of a stereoscopic image according to the third embodiment.
Figure 11A:
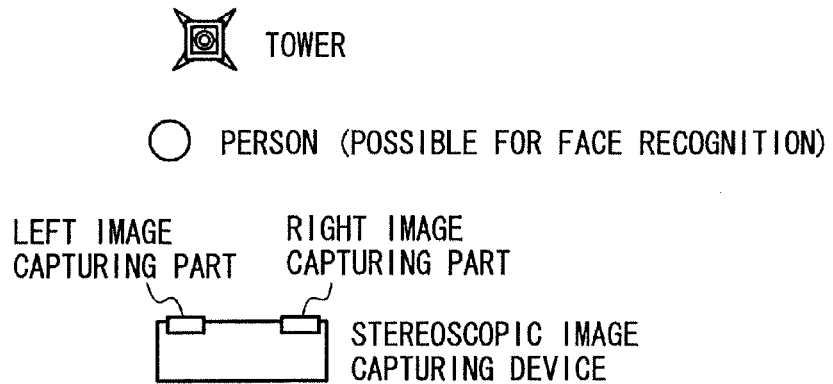
FIG. 11A is a diagram schematically illustrating position relationship between right and left image capturing parts of a stereoscopic image capturing device and subjects (person and tower).
Figure 11B:
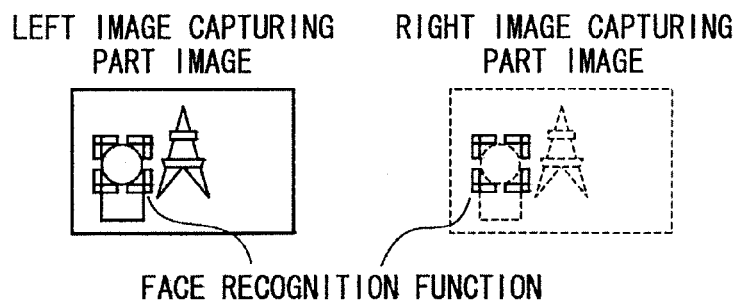
FIG. 11B is a diagram illustrating images obtained by capturing the subjects using the right and left image capturing parts in the position relationship in FIG. 11A (right image capturing part image and left image capturing part image, respectively).
Figure 11C:
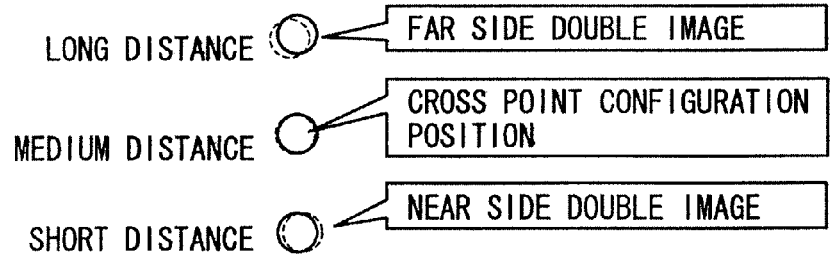
FIG. 11C is a diagram schematically illustrating relationship between the positions of the subjects and the images of the subjects obtained from the right image capturing part image and left image capturing part image.
Figure 11D:
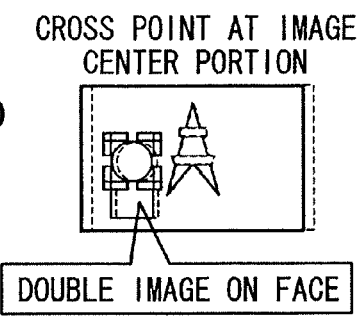
FIG. 11D illustrates the right image capturing part image and left image capturing part image in the case that a cross point is configured to the center portion of the images.
Figure 11E:
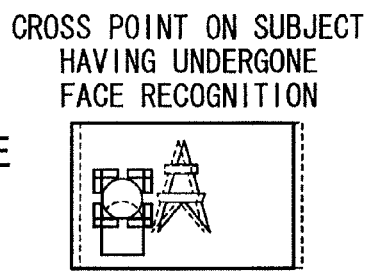
FIG. 11E illustrates the right image capturing part image and left image capturing part image in the case that a cross point is configured to the subject having undergone face recognition.

FIG. 10A to FIG. 10C illustrate display examples according to this processing. As illustrated in FIG. 10A, when displaying the whole image, the parallax adjustment is performed, setting the primary face region as a reference (S37). As illustrated in FIG. 10B, when the selected face region, herein face D, is not present around the center of the screen, as illustrated in FIG. 10C, the position of the cutting-out frame is adjusted such that the face region D selected by the user and the other face regions A, B and D are present around the center of the image, namely, such that the face region D is contained within the region enclosed by the broken line in the figure.

Generally, an image is played back in the composition at the time of image capturing, whereas a close-up of a specific face is sometimes wanted without change of the whole atmosphere, in case of the image including face information. In such a case, the parallax and angle of view are adjusted automatically such that the selected face and the other faces are present near the center of the angle of view to some extent and the selected face is contained within the angle of view. Thereby, it is easy for the user to recognize to which face region the parallax is matched among the displayed face regions, and visibility of all of the selected face and the other faces is improved.

A stereoscopic image display device and a stereoscopic image display method according to each of the above-mentioned embodiments are applicable to a stereoscopic image display device or an image capturing device having a function of displaying stereoscopic images, and can be provided as a computer-readable program for causing the above-mentioned processing, a recording medium storing the program, and the like.

REFERENCE SIGNS LIST

42: display controller, 49: parallax detection part, 63: parallax adjustment part, 64: face recognition part, 66: face correspondence decision part

The invention claimed is:

1. A stereoscopic image display device comprising:
   a face recognition processor configured to recognize face regions respectively from different view point images;
   a face correspondence decision processor configured to decide correspondence relations between the face regions respectively in the different view point images recognized by the face recognition processor;
   a parallax information acquisition processor configured to acquire parallax information for pairs of relevant face regions whose correspondence relations are decided by the face correspondence decision processor;
   a display method selection processor configured to select a display method of a pair of relevant face regions;
   a face region selection processor configured to select a specific pair of relevant face regions out of the pairs of relevant face regions according to the display method selected by the display method selection processor;
   a parallax adjustment processor configured to adjust a parallax amount of the specific pair of relevant face regions in the view point images based on the parallax information of the specific pair of relevant face regions selected by the face region selection processor;

and a display displaying a stereoscopic image on a predetermined display device based on the view point images in which the parallax amount of the specific pair of relevant face regions is adjusted by the parallax adjustment processor, wherein the display method selection processor selects the display method of displaying the pair of relevant face regions such that all of those are contained within a predetermined angle of view, setting the selected pair of relevant face region as a reference, the face region selection processor includes a cutting-out processor configuring, in the view point image, a cutting-out range in which all of the plurality of face regions are contained within the predetermined angle of view, setting the selected pair of relevant face regions as a reference, and cutting out an image in the cutting-out range from the view point image, the parallax adjustment processor adjusts the parallax amount of the selected pair of relevant face regions, cut out by the cutting-out processor, in the view point image based on the parallax information of the selected relevant pair of face regions, and the display displays the cut-out image for which the parallax amount is adjusted.

2. A stereoscopic image display device comprising:

a face recognition processor configured to recognize face regions respectively from different view point images;

a face correspondence decision processor configured to decide correspondence relations between the face regions respectively in the different view point images recognized by the face recognition processor;

a parallax information acquisition processor configured to acquire parallax information for pairs of relevant face regions whose correspondence relations are decided by the face correspondence decision processor;

a display method selection processor configured to select a display method of a pair of relevant face regions;

a face region selection processor configured to select a specific pair of relevant face regions out of the pairs of relevant face regions according to the display method selected by the display method selection processor;

a parallax adjustment processor configured to adjust a parallax amount of the specific pair of relevant face regions in the view point images based on the parallax information of the specific pair of relevant face regions selected by the face region selection processor; and a display displaying a stereoscopic image on a predetermined display device based on the view point images in which the parallax amount of the specific pair of relevant face regions is adjusted by the parallax adjustment processor, wherein the display method selection processor selects a display method of displaying each of the face regions in each of partition screens separately, the face region selection processor selects a face region displayed in each partition screen out of the face regions, the parallax adjustment processor adjusts the parallax amount for each face region displayed in each of the partition screens based on the parallax information of each face region displayed in each of the partition screens; and further includes a cutting-out processor cutting out each face region selected by the face region selection processor from the view point image for which the parallax amount for each of the face regions is adjusted, and wherein the display displays the view point image of each face region cut out by the cutting-out processor in each partition screen.

3. A stereoscopic image display device comprising:

a face recognition processor configured to recognize face regions respectively from different view point images;

a face correspondence decision processor configured to decide correspondence relations between the face regions respectively in the different view point images recognized by the face recognition processor;

a parallax information acquisition processor configured to acquire parallax information for pairs of relevant face regions whose correspondence relations are decided by the face correspondence decision processor;

a display method selection processor configured to select a display method of a pair of relevant face regions;

a face region selection processor configured to select a specific pair of relevant face regions out of the pairs of relevant face regions according to the display method selected by the display method selection processor;

a parallax adjustment processor configured to adjust a parallax amount of the specific pair of relevant face regions in the view point images based on the parallax information of the specific pair of relevant face regions selected by the face region selection processor; and a display displaying a stereoscopic image on a predetermined display device based on the view point images in which the parallax amount of the specific pair of relevant face regions is adjusted by the parallax adjustment processor, wherein the display method selection processor selects any one out of the face regions and selects a display method of displaying the face regions such that all of those are contained within a predetermined angle of view, setting the selected face region as a reference, the face region selection processor selects any one face region out of the face regions, the parallax adjustment processor adjusts the parallax amount of the selected face region in the view point image selected by the face region selection processor based on the parallax information of the selected face region; and further includes a cutting-out processor configured to cut, in the view point image, a cutting-out range in which all of the plurality of face regions are contained within the predetermined angle of view, setting the selected face region as a reference, and cutting out an image in the cutting-out range from the view point image, and wherein the display displays the cut-out image which the cutting-out processor has cut out from the view point image.

4. A stereoscopic image display method comprising: using a computer to perform steps of:

recognizing face regions respectively from different view point images;

deciding correspondence relations between the face regions respectively in the different view point images as a face correspondence decision;

acquiring parallax information for pairs of relevant face regions whose correspondence relations are decided by the face correspondence decision;

selecting a display method of a pair of relevant face regions;

selecting a specific pair of relevant face regions out of the pairs of relevant face regions according to the display method selected;

adjusting a parallax amount of the specific pair of relevant face regions in the view point images based on the parallax information of the specific pair of relevant face regions selected; and displaying a stereoscopic image on a predetermined display device based on the view point images in which the parallax amount of the specific pair of relevant face regions is adjusted, wherein the selecting the display method comprises selecting the display method of displaying the pair of relevant face regions such that all of those are contained within a predetermined angle of view, setting the selected pair of relevant face region as a reference, the face region selecting includes cutting-out, from the view point image, a cutting-out range in which all of the plurality of face regions are contained within the predetermined angle of view, setting the selected pair of relevant face regions as a reference, and cutting out an image in the cutting-out range from the view point image, the parallax adjusting includes adjusting the parallax amount of the selected pair of relevant face regions, cut out by the cutting-out process from the view point image based on the parallax information of the selected relevant pair of face regions, and the displaying includes displaying the cut-out image for which the parallax amount is adjusted.

5. A non-transitory computer-readable recording medium, when a processor reads and executes commands stored in the recording medium, to cause the processor to perform steps of:

recognizing face regions respectively from different view point images;

deciding correspondence relations between the face regions respectively in the different view point images as a face correspondence decision;

acquiring parallax information for pairs of relevant face regions whose correspondence relations are decided by the face correspondence decision;

selecting a display method of a pair of relevant face regions;

selecting a specific pair of relevant face regions out of the pairs of relevant face regions according to the display method selected;

adjusting a parallax amount of the specific pair of relevant face regions in the view point images based on the parallax information of the specific pair of relevant face regions selected; and displaying a stereoscopic image on a predetermined display device based on the view point images in which the parallax amount of the specific pair of relevant face regions is adjusted, wherein the selecting the display method comprises selecting the display method of displaying the pair of relevant face regions such that all of those are contained within a predetermined angle of view, setting the selected pair of relevant face region as a reference, the face region selecting includes cutting-out, from the view point image, a cutting-out range in which all of the plurality of face regions are contained within the predetermined angle of view, setting the selected pair of relevant face regions as a reference, and cutting out an image in the cutting-out range from the view point image, the parallax adjusting includes adjusting the parallax amount of the selected pair of relevant face regions, cut out by the cutting-out process from the view point image based on the parallax information of the selected relevant pair of face regions, and the displaying includes displaying the cut-out image for which the parallax amount is adjusted.

* * * * *